United States Patent
Inoue

(10) Patent No.: US 12,552,950 B2
(45) Date of Patent: Feb. 17, 2026

(54) INKJET INK AND INKJET RECORDING APPARATUS

(71) Applicant: KYOCERA Document Solutions Inc., Osaka (JP)

(72) Inventor: Toyotsune Inoue, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 256 days.

(21) Appl. No.: 18/355,915

(22) Filed: Jul. 20, 2023

(65) Prior Publication Data

US 2024/0026175 A1    Jan. 25, 2024

(30) Foreign Application Priority Data

Jul. 22, 2022  (JP) ................. 2022-117046

(51) Int. Cl.
  *C09D 11/322*  (2014.01)
  *B41J 2/165*   (2006.01)
  (Continued)

(52) U.S. Cl.
  CPC ......... *C09D 11/322* (2013.01); *B41J 2/16535* (2013.01); *B41J 2/16538* (2013.01);
  (Continued)

(58) Field of Classification Search
  CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002;
  (Continued)

(56) References Cited

U.S. PATENT DOCUMENTS

2024/0026173 A1* 1/2024 Ishida .................... B41J 2/2146
2024/0026174 A1* 1/2024 Ozawa ................... B41J 2/2146
(Continued)

FOREIGN PATENT DOCUMENTS

JP    2000-273383 A    10/2000

*Primary Examiner* — Manish S Shah
(74) *Attorney, Agent, or Firm* — Studebaker Brackett PLLC

(57) ABSTRACT

An inkjet ink contains a quinacridone pigment, a resin, and an aqueous medium. A 50-fold dilution of a supernatant obtained by centrifugating the inkjet ink at 1,050,000 G for 3 hours has a phosphorous concentration of at least 1.0 ppm and no greater than 6.0 ppm. On an ultraviolet-visible absorption spectrum of the supernatant, a first peak appears at a first absorbance of at least 0.16 and no greater than 0.40. The first peak is a maximum peak in a wavelength range of the ultraviolet-visible absorption spectrum of at least 300 nm and no greater than 340 nm. On the ultraviolet-visible absorption spectrum of the supernatant, a second peak appears at a second absorbance of at least 0.15 and no greater than 0.80. The second peak is a maximum peak in a wavelength range of the ultraviolet-visible absorption spectrum of at least 400 nm and no greater than 490 nm.

10 Claims, 5 Drawing Sheets

(51) Int. Cl.
*B41J 2/21* (2006.01)
*C09D 11/107* (2014.01)
*C09D 11/326* (2014.01)

(52) U.S. Cl.
CPC ....... *B41J 2/16552* (2013.01); *B41J 2/16585* (2013.01); *B41J 2/2107* (2013.01); *C09D 11/107* (2013.01); *C09D 11/326* (2013.01); *B41J 2002/16558* (2013.01); *B41J 2002/16591* (2013.01)

(58) Field of Classification Search
CPC .... B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

2024/0166903 A1* 5/2024 Yoshii .................. C09D 11/322
2024/0182732 A1* 6/2024 Nakanishi ................. B41J 2/01

* cited by examiner

INKJET INK AND INKJET RECORDING APPARATUS

INCORPORATION BY REFERENCE

The present application claims priority under 35 U.S.C. § 119 to Japanese Patent Application No. 2022-117046, filed on Jul. 22, 2022. The contents of this application are incorporated herein by reference in their entirety.

BACKGROUND

The present disclosure relates to an inkjet ink and an inkjet recording apparatus.

An inkjet ink is ejected from recording heads included in an inkjet recording apparatus. The inkjet ink is demanded to have ejection stability in ink ejection from the recording heads. To meet such a demand, a liquid for inkjet recording use is proposed that contains a water-based pigment dispersion. The water-based pigment dispersion contains an aqueous liquid, a quinacridone pigment dispersed in the aqueous liquid, a water-soluble quinacridone derivative adsorbed on the surface of the quinacridone pigment, and a non-adsorbed water-soluble quinacridone derivative.

SUMMARY

An inkjet ink according to an aspect of the present disclosure contains a quinacridone pigment, a resin, and an aqueous medium. A 50-fold dilution of a supernatant has a phosphorous concentration of at least 1.0 ppm and no greater than 6.0 ppm. The supernatant is obtained by centrifugation of the inkjet ink at 1,050,000 G for 3 hours. On an ultraviolet-visible absorption spectrum of the supernatant, a first peak appears at a first absorbance of at least 0.16 and no greater than 0.40. The first peak is a maximum peak in a wavelength range of the ultraviolet-visible absorption spectrum of at least 300 nm and no greater than 340 nm. On the ultraviolet-visible absorption spectrum of the supernatant, a second peak appears at a second absorbance of at least 0.15 and no greater than 0.80. The second peak is a maximum peak in a wavelength range of the ultraviolet-visible absorption spectrum of at least 400 nm and no greater than 490 nm.

An inkjet recording apparatus according to an aspect of the present disclosure includes a conveyance section that conveys a recording medium and a recording head that ejects an ink toward the recording medium. The ink is the aforementioned inkjet ink.

DETAILED DESCRIPTION

Figure 1:
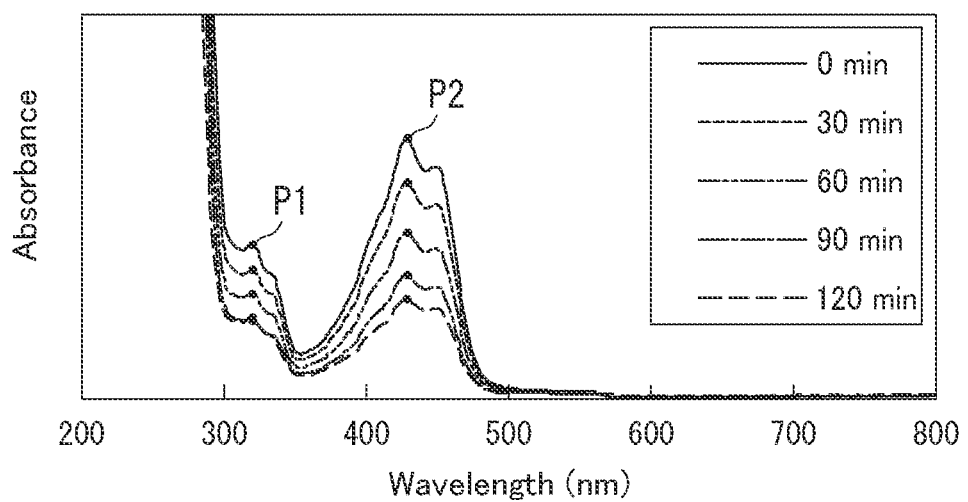
FIG. 1 is a graph representation showing examples of an ultraviolet-visible absorption spectrum of a supernatant.

The following describes embodiments of the present disclosure. Terms used in the present specification are explained first. Values for volume median diameter ($D_{50}$) are values as measured using a dynamic light scattering type particle size distribution analyzer (e.g., "ZETASIZER (registered Japanese trademark) NANO ZS", product of Malvern Instruments Ltd.) unless otherwise stated. Values for acid value are values as measured in accordance with the Japanese Industrial Standards (JIS) K0070:1992 unless otherwise stated. Values for mass average molecular weight (Mw) are values as measured using gel permeation chromatography unless otherwise stated. In the present specification, the term "(meth)acryl" is used as a generic term for both acryl and methacryl. The phrase "each represent, independently of one another," in description about formulas means possibly representing the same group or different groups. For each component indicated in the present specification, one type of the component may be used independently, or two or more types of the component may be used in combination.

First Embodiment: Inkjet Ink

The following describes an inkjet ink (also referred to below simply as ink) according to a first embodiment of the present disclosure.

The ink of the first embodiment contains a quinacridone pigment, a resin, and an aqueous medium. A 50-fold dilution of a supernatant has a phosphorous concentration of at least 1.0 ppm and no greater than 6.0 ppm. The supernatant is obtained by centrifugation of the ink at 1,050,000 G for 3 hours. On an ultraviolet-visible absorption spectrum of the supernatant, a first peak appears at a first absorbance of at least 0.16 and no greater than 0.40. The first peak is a maximum peak in a wavelength range of the ultraviolet-visible absorption spectrum of at least 300 nm and no greater than 340 nm. On the ultraviolet-visible absorption spectrum of the supernatant, a second peak appears at a second absorbance of at least 0.15 and no greater than 0.80. The second peak is a maximum peak in a wavelength range of the ultraviolet-visible absorption spectrum of at least 400 nm and no greater than 490 nm.

In the following, the "supernatant obtained by centrifugation of the ink at 1,050,000 G for 3 hours" may be also referred to below simply as "supernatant". The "phosphorous concentration of the 50-fold dilution of the supernatant obtained by centrifugation of the inkjet ink at 1,050,000 G for 3 hours" may be referred to as "specific phosphorous concentration". Furthermore, the "first absorbance at the first peak on the ultraviolet-visible absorption spectrum of the supernatant" may be also referred to below as "first absorbance of the supernatant". The "second absorbance at the second peak on the ultraviolet-visible absorption spectrum of the supernatant" may be also referred to below as "second absorbance of the supernatant".

As a result of having the above features, the ink of the first embodiment can inhibit occurrence of skewed ink ejection from recording heads, form images with excellent scratch resistance, and have excellent re-solubility. Reasons thereof can be inferred as follows.

For ease of understanding, a quinacridone pigment synthesis method is summarized first. A quinacridone pigment is a compound represented by formula (2), for example. The quinacridone pigment is synthesized through reactions represented by reaction formulas (r-a), (r-b), (r-c), and (r-1).

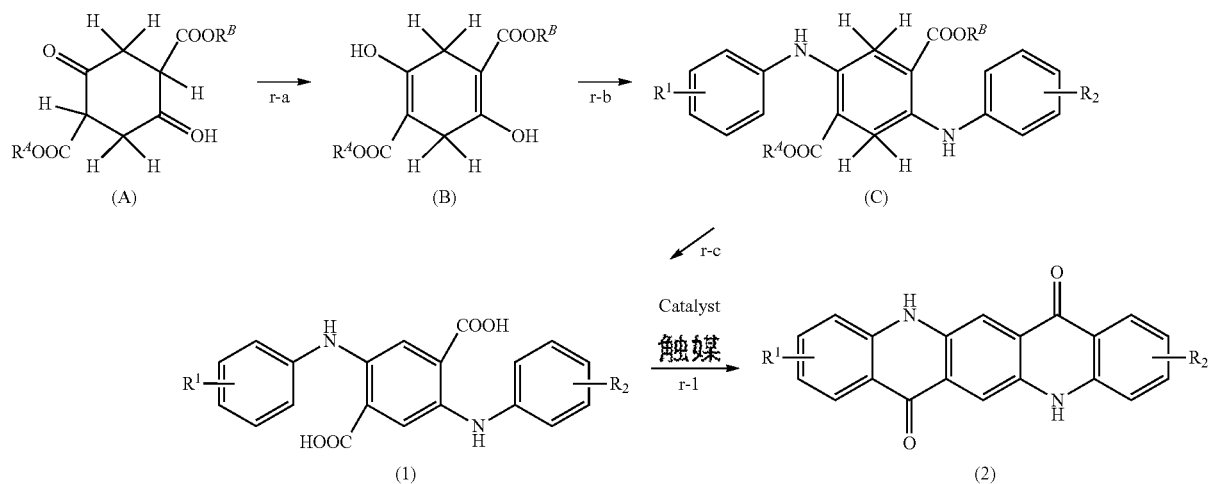

In formulas (A), (B), (C), (1), and (2), $R^A$, $R^B$, $R^1$, and $R^2$ each represent, independently of one another, a monovalent group. In the following, the "reactions represented by reaction formulas (r-a), (r-b), (r-c), and (r-1)" may be also referred to below as "reactions (r-a), (r-b), (r-c), and (r-1)", respectively. Furthermore, "compounds represented by formulas (A), (B), (C), (1), and (2)" may be also referred to below as "compounds (A), (B), (C), (1), and (2)", respectively. Where $R^1$ and $R^2$ each represent a methyl group, the compound (2) is C.I. Pigment Red 122. Where $R^1$ and $R^2$ each represent a hydrogen atom, the compound (2) is C.I. Pigment Violet 19.

In the course of the reactions (r-a), (r-b), and (r-c), the compounds (B) and (C) are produced each as an intermediate. Furthermore, in the reaction (r-1), the compound (2) is obtained by reaction of the compound (1) in presence of a catalyst. The catalyst used in the reaction (r-1) includes a phosphorous-containing catalyst, for example. One quinacridone pigment synthesis method has been explained so far.

The intermediates (more specifically, the compounds (B) and (C)) produced in the course of the reactions (r-a), (r-b), and (r-c) and the phosphorous-containing catalyst used in the reaction (r-1) may remain in the quinacridone pigment as impurities. The ink containing such the quinacridone pigment contains the intermediates and the phosphorous-containing catalyst. The intermediates and the phosphorous-containing catalyst have relatively high polarity. Therefore, when images are formed with the ink containing the quinacridone pigment, the intermediates and the phosphorous-containing catalyst may electrostatically attach to the ejection surfaces of recording heads and the inner walls of nozzle orifices. The attached intermediates and phosphorous-containing catalyst serve as a cause of skewed ink ejection from recording heads.

In the ink of the first embodiment, the specific phosphorous concentration is at least 1.0 ppm and no greater than 6.0 ppm. When the specific phosphorous concentration is no greater than 6.0 ppm, occurrence of skewed ink ejection from recording heads can be inhibited because the amount of the phosphorous-containing catalyst being an impurity is relatively small. However, when a trace amount of the phosphorous-containing catalyst is contained in the ink, the phosphorous-containing catalyst being an impurity though contributes to increase in re-solubility of the ink. Accordingly, when the specific phosphorous concentration is at least 1.0 ppm, re-solubility of the ink increases. In the present specification, the term re-solubility of the ink means a characteristic by which dried ink attached to and dried on the ejection surfaces of recording heads easily dissolves in either or both a cleaning liquid and a purging ink.

Furthermore, the supernatant of the ink of the first embodiment has a second absorbance of at least 0.15 and no greater than 0.80. The second peak is a peak derived from the intermediates (specific examples include the compounds (B) and (C)) for synthesis of the quinacridone pigment, for example. As a result of the second absorbance of the supernatant being set to no greater than 0.80, a relatively small amount of intermediates being impurities remain. Accordingly, occurrence of skewed ink ejection from recording heads can be inhibited. However, when a trace amount of the intermediates is contained in the ink, the intermediates being impurities though contribute to increase in re-solubility of the ink. Accordingly, when the second absorbance of the supernatant is at least 0.15, re-solubility of the ink increases.

Furthermore, the first absorbance of the supernatant of the ink of the first embodiment is at least 0.16 and no greater than 0.40. The first peak is a peak derived from a non-adsorbed resin, for example. Note that the non-adsorbed resin is described later in detail. The non-adsorbed resin may electrostatically attach to the ejection surfaces of the recording heads and the inner walls of the nozzle orifices likewise the intermediates and the phosphorous-containing catalyst. The attached non-adsorbed resin also serves as a cause of skewed ink ejection from recording heads. As a result of the first absorbance of the supernatant being set to no greater than 0.40, a relatively small amount of the non-adsorbed resin remains in the ink. Accordingly, occurrence of skewed ink ejection from recording heads can be inhibited. By contrast, when the first absorbance of the supernatant is at least 0.16, the percentage content of the non-adsorbed resin is not so low in the ink to increase adhesion of the ink to recording mediums. As a result, images with excellent scratch resistance can be formed with the ink.

The reasons have been described so far why the ink of the first embodiment can inhibit occurrence of skewed ink ejection from recording heads, form images with excellent scratch resistance, and have excellent re-solubility. The ink of the first embodiment is described further in detail below.

<Specific Phosphorous Concentration>

As described previously, the specific phosphorous concentration is at least 1.0 ppm and no greater than 6.0 ppm. In order to further increase re-solubility of the ink, the specific phosphorous concentration is preferably at least 2.0 ppm. In order to further inhibit occurrence of skewed ink ejection from recording heads, the specific phosphorous concentration is preferably no greater than 5.0 ppm.

The specific phosphorous concentration is a concentration of a phosphorous atom that is contained in the supernatant and that is derived from the phosphorous-containing catalyst for synthesis of the quinacridone pigment, for example. That is, the specific phosphorous concentration is a concentration of the phosphorous atom of the phosphorous-containing catalyst contained in the supernatant, for example.

The phosphorous-containing catalyst for synthesis of the quinacridone pigment is at least one selected from the group consisting of polyphosphoric acid and a derivative thereof, for example. As such, the specific phosphorous concentration is a concentration of a phosphorous atom included in at least on selected from the group consisting of polyphosphoric acid and a derivative thereof contained in the supernatant. In the following, "at least one selected from the group consisting of polyphosphoric acid and a derivative thereof" may be refer to "polyphosphoric acids".

Examples of the derivative of polyphosphoric acid among the polyphosphoric acids include polyphosphate esters, and more specific examples thereof include polyphosphate alkyl esters. A preferable polyphosphate alkyl ester is polyphosphate methyl ester. The catalyst used in the reaction (r-1) may further include a metal catalyst such as tin in addition to the phosphorous-containing catalyst.

Removal of at least a portion of the phosphorous-containing catalyst remaining in the quinacridone pigment by ultrafiltration reduces the specific phosphorous concentration, for example. For example, the specific phosphorous concentration can be adjusted by changing a circulation time of the pigment dispersion in ultrafiltration of the pigment dispersion. The specific phosphorous concentration tends to reduce as the circulation time of the pigment dispersion is increased. The specific phosphorous concentration is measured by the method described in Examples, for example.

<First Absorbance and Second Absorbance>

The following describes the first absorbance and the second absorbance with reference to FIG. 1. FIG. 1 is a graph representation showing ultraviolet-visible absorption spectra of supernatants obtained by centrifugation of five reference inks at 1,050,000 G for 3 hours. Note that the five reference inks differ from the later-described inks of Examples and Comparative Examples but are presented as examples for explaining the first absorbance and the second absorbance. The five reference inks each contain at least a quinacridone pigment (C.I. Pigment Red 122), a resin (resin (R-A) described later), and an aqueous medium. In FIG. 1, the vertical axis indicates absorbance and the horizontal axis indicates wavelength (unit: nm). Each of 0 min, 30 min, 60 min, 90 min, and 120 min in FIG. 1 indicates a circulation time of a corresponding one of pigment dispersions in ultrafiltration treatment. In preparation of the five reference inks, the respective pigment dispersions are used that have been subjected to ultrafiltration treatment for circulation times of 0 minutes, 30 minutes, 60 minutes, 90 minutes, and 120 minutes. The ultraviolet-visible absorption spectra of the supernatants obtained from the five reference inks are plotted by the method described later in Examples. The plotted spectra are shown in FIG. 1. In FIGS. 1, P1 and P2 indicate the first peak P1 and the second peak P2, respectively. P1 and P2 are affixed to only the spectrum of the reference ink with the pigment dispersion for which circulation time in ultrafiltration treatment is 0 minutes, and are not affixed to the spectra of the other reference inks.

The first peaks P in FIG. 1 are maximum peaks in a wavelength range of at least 300 nm and no greater than 340 nm. The second peaks are maximum peaks in a wavelength range of at least 400 nm and no greater than 490 nm. The maximum peaks each mean a peak having a maximum absorbance among peaks (i.e., apexes) in convex curves of the corresponding spectrum appearing in a corresponding specific wavelength range.

In the examples shown in FIG. 1, it can be confirmed that peaks with a maximum absorbance appear at a wavelength of 320 nm among the peaks appearing in a wavelength range of at least 300 nm and no greater than 340 nm. As such, the peaks at a wavelength of 320 nm are the first peaks P1. Reading the absorbance at the first peak P1 from an ultraviolet-visible absorption spectrum can obtain the first absorbance.

In addition, it can be confirmed in the examples shown in FIG. 1 that peaks with a maximum absorbance appear at a wavelength of 429 nm among the peaks appearing in a wavelength range of at least 400 nm and no greater than 490 nm. As such, the peaks at a wavelength of 429 nm are the second peaks P2. Reading the absorbance at the second peak P2 from an ultraviolet-visible absorption spectrum can obtain the second absorbance.

Note that in the examples shown in FIG. 1, the spectra are descending and do not form convex curves in a wavelength range of no greater than 310 nm. Therefore, it is determined that no peaks are present on the convex curves of the spectra within a wavelength range of no greater than 310 nm in the examples shown in FIG. 1. As shown in FIG. 1, the first absorbance and the second absorbance of the supernatant tend to decrease as the circulation time in ultrafiltration treatment is increased. The first absorbance and the second absorbance have been described so far with reference to FIG. 1. The following further describes the first absorbance and the second absorbance of the supernatant.

As described previously, the first absorbance of the supernatant is at least 0.16 and no greater than 0.40. In order to form images with excellent scratch resistance, the first absorbance of the supernatant is preferably at least 0.20. In order to inhibit occurrence of skewed ink ejection from recording heads, the first absorbance of the supernatant is preferably no greater than 0.35. The first peak is a peak derived from the non-adsorbed resin contained in the ink, for example. The amount of the non-adsorbed resin can be adjusted by changing the ratio of the resin in the ink, for example. Furthermore, the first absorbance at the first peak can be adjusted by changing the amount of the non-adsorbed resin of the pigment dispersion for changing the amount of the non-adsorbed resin in the ink containing the pigment dispersion. More specifically, the amount of the non-adsorbed resin can be adjusted by changing at least one of the discharge amount of the pigment dispersion in dispersion treatment, the number of times of passing of the pigment dispersion in activated carbon treatment, and the circulation time of the pigment dispersion in ultrafiltration treatment, which are described later in Examples. The amount of the non-adsorbed resin tends to increase and the first absorbance of the supernatant tends to increase as the discharge amount of the pigment dispersion in dispersion treatment is increased. As the number of times of passing in activated carbon treatment of the pigment dispersion is increased, the non-adsorbed resin is removed a lot and the first absorbance of the supernatant tends to decrease. As the circulation time of the pigment dispersion in ultrafiltration treatment is increased, the non-adsorbed resin is removed a lot and the first absorbance of the supernatant tends to decrease.

As described previously, the second absorbance of the supernatant is at least 0.15 and no greater than 0.80. In order to increase re-solubility of the ink, the second absorbance of the supernatant is preferably at least 0.20. In order to inhibit occurrence of skewed ink ejection from recording heads, the second absorbance of the supernatant is preferably no greater than 0.70. For example, the second peak is a peak derived from the intermediates for synthesis of the quinacridone pigment that are contained in the ink. More specifically, the second peak is a peak derived from the compounds (B) and (C) being the intermediates contained in the ink. As such, the second absorbance at the second peak can be adjusted by changing the amount of the intermediates in the pigment dispersion for changing the amount of the intermediates in the ink containing the pigment dispersion. For example, the amount of the intermediates can be changed by changing at least one of the number of times of passing of the pigment dispersion in activated carbon treatment and the circulation time of the pigment dispersion in ultrafiltration treatment, which are descried later in Examples. As the number of times of passing of the pigment dispersion in activated carbon treatment is increased, the intermediates are removed a lot, and the second absorbance of the supernatant tends to decrease. As the circulation time of the pigment dispersion in ultrafiltration treatment is increased, the intermediates are removed a lot and the second absorbance of the supernatant tends to decrease.

<Quinacridone Pigment>

Examples of the quinacridone pigment contained in the ink include C.I. Pigment Violet (19 or 42), C.I. Pigment Red (122, 202, 206, 207, or 209), and C.I. Pigment Orange (48 or 49).

Examples of commercially available products that can be used as the quinacridone pigment include "TRM-11" produced by Dainichiseika Color & Chemicals Mfg. Co., Ltd., "CINQUASIA (registered Japanese trademark) MAGENTA D4550" produced by BASF, "CINQUASIA (registered Japanese trademark) PINK D4450" produced by BASF, "INKJET MAGENTA E-S" produced by Clariant (Japan) K.K., "HOSTAPERM PINK E 02" produced by Clariant (Japan) K.K., "HOSTAPERM RED E3B" produced by Clariant (Japan) K.K., and "HOSTAPERM RED E5B 02" produced by Clariant (Japan) K.K.

The quinacridone pigment has a percentage content in the ink of preferably at least 1% by mass and no greater than 12% by mass, and more preferably at least 4% by mass and no greater than 8% by mass. As a result of the percentage content of the quinacridone pigment being set to at least 1% by mass, images formed with the ink can have favorable image density. As a result of the percentage content of the quinacridone pigment being set to no greater than 12% by mass by contrast, the ink can have favorable fluidity. The ink may contain only the quinacridone pigment as a pigment. Alternatively, the ink may further contain any other pigments as a pigment in addition to the quinacridone pigment in order to adjust hue of the ink.

The quinacridone pigment synthesis method, which has been summarized previously, is described in more detail below.

Examples of the monovalent group represented by R A and R B in formulas (A), (B), and (C) above includes an alkyl group and an aryl group. The monovalent group represented by R A and R B is preferably an alkyl group, more preferably an alkyl group with a carbon number of at least 1 and no greater than 6, and further preferably an ethyl group.

Examples of the monovalent group represented by $R^1$ and $R^2$ in formulas (C), (1), and (2) above include a hydrogen atom, an alkyl group, and a halogen atom. The halogen atom represented by $R^1$ and $R^2$ is preferably a chlorine atom. The alkyl group represented by $R^1$ and $R^2$ is preferably an alkyl group with a carbon number of at least 1 and no greater than 6, and more preferably a methyl group.

In the reaction (r-a), the compound (B) is obtained from the compound (A). Next in the reaction (r-b), 1 mole equivalent of the compound (B) is caused to react with 2 mole equivalents of an aniline derivative to obtain 1 mole equivalent of the compound (C). Next in the reaction (r-c), the compound (C) is oxidized to obtain an oxide of the compound (C) and the oxide of the compound (C) is hydrolyzed to obtain the compound (1).

Next in the reaction (r-1), the compound (1) is caused to react under presence of a catalyst to obtain the compound (2). The catalytic reaction (r-1) is a dehydration-ring-closing reaction. For example, in the reaction (r-1), the compound (1) is heated under pressure at a first specific temperature for a specific time under presence of a catalyst (e.g., a phosphorous-containing catalyst, especially polyphosphoric acids). The first specific temperature is at least 85° C. and no greater than 200° C., for example. The specific time is at least 1 hour and no greater than 3 hours, for example. In the reaction (r-1), an organic solvent such as acetone may be used in addition to the compound (1) and the catalyst. Alternatively, an alkali salt obtained by saponifying the compound (1) may be used in the reaction (r-1) in place of the compound (1). Alternatively, an oxide of the compound (C) may be used in the reaction (r-1) in place of the compound (1).

After the reaction (r-1), the compound (2) is treated with alkali as necessary. Thus, a β-type quinacridone pigment is obtained. The alkali treatment can be performed in a manner that alkali and a wet cake of the compound (2) are heated at a second specific temperature using an autoclave, for example. The second specific temperature is at least 120° C. and no greater than 200° C., for example. The alkali treatment may use an organic solvent in addition. Examples of the organic solvent that can be used in the alkali treatment include N,N-dimethylformamide and glycol.

The quinacridone pigment synthesis method through the reaction (r-1) does not require desorption of a sulfonic acid group or a sulfonate chloride group remaining in a produced quinacridone pigment using sulfuric acid as compared to a synthesis method using an acid having a sulfonic acid group as a ring-closing agent. Therefore, the quinacridone pigment synthesis method through the reaction (r-1) can be implemented easily.

<Resin>

A portion of the resin contained in the ink is adsorbed to the quinacridone pigment, for example. Resins are hydrophilic. Therefore, the adsorbed resin adsorbed to the surface of the quinacridone pigment disperses the quinacridone pigment in the aqueous medium. The resin as above is also called pigment dispersion resin.

The resin includes an adsorbed resin and a non-adsorbed resin. That is, the ink contains the adsorbed resin and the non-adsorbed resin as the resin. The adsorbed resin is adsorbed to the quinacridone pigment. The adsorbed resin constitutes pigment particles together with the quinacridone pigment, for example. The pigment particles each include a core and a coat layer covering the core, for example. The cores of the pigment particles contain the quinacridone pigment. The coat layers of the pigment particles contain the resin. By contrast, the non-adsorbed resin is not adsorbed to the quinacridone pigment. The non-adsorbed resin is free in the aqueous medium.

The percentage content of the non-adsorbed resin in the resin is preferably at least 20% by mass and no greater than 50% by mass. In the following, the "percentage content of the non-adsorbed resin in the resin" may be also referred to below as "non-adsorbed resin rate". As a result of the non-adsorbed resin rate being set to at least 20% by mass, images with excellent scratch resistance can be formed with the ink. As a result of the non-adsorbed resin rate being set to no greater than 50% by mass, occurrence of skewed ink ejection from recording heads can be inhibited. The non-adsorbed resin rate can be measured by centrifugating the ink using a centrifuge. The non-adsorbed resin rate can be calculated using a calculation formula "(non-adsorbed resin rate)=100×(mass of non-adsorbed resin)/(mass of resin)=100×(mass of non-adsorbed resin)/((mass of non-adsorbed resin)+(mass of adsorbed resin))". For example, the non-adsorbed resin rate tends to increase as the discharge amount in later-described dispersion treatment is increased.

Examples of the resin include (meth)acrylic resin, styrene-(meth)acrylic resin, styrene-maleic acid resin, and urethane resin. In terms of stably dispersing the quinacridone pigment, the resin is preferably styrene-(meth)acrylic resin.

Styrene-(meth)acrylic resin includes, each as a repeating unit, at least one repeating unit derived from styrene or a derivative thereof and at least one repeating unit derived from (meth)acrylic acid. Preferably, the styrene-(meth)acrylic resin further includes at least one repeating unit derived from (meth)acrylic acid ester as a repeating unit.

Examples of a first monomer that can form the repeating unit derived from styrene or a derivative thereof include styrene, α-methylstyrene, and vinyltoluene. The first monomer is preferably styrene. Preferably, the repeating unit derived from styrene or a derivative thereof has a percentage content to all repeating units included in the resin of at least 25.0% by mass and no greater than 60.0% by mass.

Examples of a second monomer that can form the repeating unit derived from (meth)acrylic acid include acrylic acid and methacrylic acid. The second monomer is preferably methacrylic acid. The repeating unit derived from (meth)acrylic acid has a percentage content to all the repeating units included in the resin of preferably at least 4.5% by mass and no greater than 15.0% by mass, and more preferably at least 8.0% by mass and no greater than 11.0% by mass. When the resin includes both of a repeating unit derived from acrylic acid and a repeating unit derived from methacrylic acid, the percentage content of the repeating unit derived from (meth)acrylic acid is the total percentage content of the repeating unit derived from acrylic acid and the repeating unit derived from methacrylic acid.

Examples of a third monomer that can form the repeating unit derived from (meth)acrylic acid ester include (meth) acrylic acid alkyl ester. The (meth)acrylic acid alkyl ester is preferably (meth)acrylic acid alkyl ester having an alkyl group with a carbon number of at least 1 and no greater than 8, more preferably (meth)acrylic acid alkyl ester having an alkyl group with a carbon number of at least 1 and no greater than 4, further preferably methyl (meth)acrylate or butyl (meth)acrylate, and particularly preferably methyl methacrylate or butyl acrylate. The percentage content of the repeating unit derived from (meth)acrylic acid ester to all the repeating units included in the resin is preferably at least 35.0% by mass and no greater than 70.0% by mass, and more preferably at least 40.0% by mass and no greater than 70.0% by mass. When the resin includes two or more repeating units derived from (meth)acrylic acid ester, the percentage content of the repeating unit derived from (meth) acrylic acid ester is the total percentage content of the two or more repeating units derived from (meth)acrylic acid ester.

Preferably, the resin includes at least one repeating unit derived from (meth)acrylic acid, at least one repeating unit derived from alkyl (meth)acrylate, and a repeating unit derived from styrene. More preferably, the resin includes one repeating unit derived from (meth)acrylic acid, one or two repeating units derived from alkyl (meth)acrylate, and a repeating unit derived from styrene. Particularly preferably, the resin includes a repeating unit derived from methacrylic acid, a repeating unit derived from methyl methacrylate, a repeating unit derived from butyl acrylate, and a repeating unit derived from styrene. The percentage content of the at least one (meth)acrylic acid (preferably, the percentage content of one repeating unit derived from (meth)acrylic acid, and more preferably the percentage content of a repeating unit derived from methacrylic acid) is preferably at least 8.0% by mass and no greater than 11.0% by mass to all the repeating units included in the resin.

The resin has an acid value of preferably at least 60 mgKOH/g and no greater than 300 mgKOH/g, more preferably at least 80 mgKOH/g and no greater than 150 mgKOH/g, and further preferably at least 100 mgKOH/g and no greater than 130 mgKOH/g. As a result of the resin having an acid value of at least 60 mgKOH/g, the pigment particles favorably disperse in the aqueous medium to allow the ink to exhibit favorable color producing power and coloring power. As a result of the resin having an acid value of no greater than 300 mgKOH/g by contrast, the ink has favorable preservation stability.

The resin has a mass average molecular weight of preferably at least 10,000 and no greater than 50,000, and more preferably at least 15,000 and no greater than 30,000. As a result of the mass average molecular weight of the resin being set to at least 10,000 and no greater than 50,000, the ink has favorable viscosity.

The ratio (also referred to below as resin/pigment ratio) of the mass of the resin to the mass of the pigment is preferably no greater than 0.50. In order to inhibit occurrence of skewed ink ejection from recording heads and favorably disperse the pigment particles in the aqueous medium, the resin/pigment ratio is preferably at least 0.35 and no greater than 0.50. The resin/pigment ratio can be calculated using a calculation formula "(resin/pigment ratio)=(mass of resin)/ (mass of pigment)".

The resin has a percentage content in the ink of preferably at least 0.5% by mass and no greater than 8.0% by mass, and more preferably at least 1.5% by mass and no greater than 4.0% by mass. As a result of the percentage content of the resin being set to at least 0.5% by mass, agglomeration of the quinacridone pigment can be favorably inhibited. As a result of the percentage content of the resin being set to no greater than 8.0% by mass, clogging of the nozzles of the recording heads can be favorably inhibited.

<Aqueous Medium>

The aqueous medium contained in the ink is a medium containing water. The aqueous medium may function as a solvent or function as a dispersion medium. Specific examples of the aqueous medium include water and an aqueous medium containing an organic solvent.

Examples of the water-soluble organic solvent include glycol compounds, triol compounds, glycol ether compounds, lactam compounds, nitrogen-containing compounds, acetate compounds, y-butyrolactone, thiodiglycol, and dimethyl sulfoxide.

Examples of the glycol compounds include ethylene glycol, 1,3-propanediol, propylene glycol, 1,3-butanediol, 1,2-pentanediol, 1,5-pentanediol, 1,2-hexanediol, 1,2-octanediol, 1,8-octanediol, 3-methyl-1,3-butanediol, 3-methyl-1,2-pentanediol, 3-methyl-1,5-pentanediol, 2,4-diethyl-1,5-pentanediol, 2-butyl-2-ethyl-1,3-propanediol, diethylene glycol, dipropylene glycol, trimethylene glycol, triethylene glycol, tripropylene glycol, tetraethylene glycol, 2-ethyl-1,2-hexanediol, and thiodiglycol. A preferable glycol compound is 3-methyl-1,5-pentanediol.

Examples of the triol compounds include glycerin, 1,2,3-butanetriol, and 1,2,6-hexanetriol. A preferable triol compound is glycerin.

Examples of the glycol ether compounds include diethylene glycol diethyl ether, diethylene glycol monoethyl ether, diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, triethylene glycol monobutyl ether, and propylene glycol monomethyl ether. A preferable glycol ether compound is triethylene glycol monobutyl ether.

Examples of the lactam compounds include 2-pyrrolidone and N-methyl-2-pyrrolidone. A preferable lactam compound is 2-pyrrolidone.

Examples of the nitrogen-containing compounds include 1,3-dimethylimidazolidinone, formamide, and dimethyl formamide.

Examples of the acetate compounds include diethylene glycol monoethyl ether acetate.

The aqueous medium is preferably a solvent mixture of water, triethylene glycol monobutyl ether, 3-methyl-1,5-pentanediol, and glycerin.

The aqueous medium has a percentage content in the ink of preferably at least 30% by mass and no greater than 95% by mass, and more preferably at least 70% by mass and no greater than 95% by mass.

<Surfactant>

Preferably, the ink further contains a surfactant. The surfactant optimizes compatibility and dispersion stability of each component contained in the ink. Furthermore, the surfactant optimizes permeability of the ink to recording mediums. The surfactant is preferably a nonionic surfactant.

Examples of the nonionic surfactant include acetylenediols and ethylene oxide addusts of acetylenediols. Examples of the acetylenediols include 2,4,7,9-tetramethyl-3,6-dimethyl-4-octine-3,6-diol, 3,5-dimethyl-1-hexyne-3-ol, and 2,4-dimethyl-5-hexyne-3-ol. A preferably nonionic surfactant is an ethylene oxide adduct of acetylenediol or an ethylene oxide adduct of acetylene glycol. The nonionic surfactant has an HLB value of preferably at least 4 and no greater than 14, and more preferably at least 4 and no greater than 8 or at least 10 and no greater than 14. When the ink contains a surfactant, the surfactant preferably has a percentage content in the ink of at least 0.01% by mass and no greater than 1.0% by mass.

<Other Components>

The ink may further contain any known additives (specific examples include a solution stabilizer, an anti-drying agent, an antioxidant, a viscosity modifier, a pH adjuster, a neutralizer, and an antifungal agent) as necessary.

(Preferable Composition)

Preferably, the ink has any one of Compositions 1 to 4 indicated below in Table 1 and Compositions 5 to 8 indicated below in Table 2. Note that "Ratio" in Tables 1 and 2 indicates a numerical range of each preferable percentage content [% by mass]. For example, "5.4-6.6" being a ratio of the quinacridone pigment in Composition 1 indicates that the quinacridone pigment of at least 5.4% by mass and no greater than 6.6% by mass is contained. Also, "R-A" and "R-B" for the types of "Resin" indicate resins (R-A) and (R-B) used in Examples, respectively. "TGME" indicates triethylene glycol monobutyl ether. "MPD" indicates 3-methyl-1,5-pentanediol. "Non-adsorbed resin rate" indicates a ratio of the non-adsorbed resin not adsorbed to the quinacridone pigment in the resin. "Specific phosphorous concentration" indicates a phosphorous concentration in a 50-fold dilution of a supernatant obtained by centrifugation of the ink at 1,050,000 G for 3 hours.

TABLE 1

| | Composition | 1 | 2 | 3 | 4 |
|---|---|---|---|---|---|
| Ratio [% by maas] | Quinacridone pigment | 5.4-6.6 | 5.4-6.6 | 5.4-6.6 | 5.4-6.6 |
| | Resin R-A | 2.2-2.6 | 2.2-2.6 | 2.2-2.6 | 2.2-2.6 |
| | R-B | — | — | — | — |
| | Non-adsorbed resin rate | 27-33 | 27-33 | 18-22 | 23-27 |
| | Surfactant | 0.2-0.4 | 0.2-0.4 | 0.2-0.4 | 0.2-0.4 |
| | TGME | 3.6-4.4 | 3.6-4.4 | 3.6-4.4 | 3.6-4.4 |
| | MPD | 18.0-22.0 | 18.0-22.0 | 18.0-22.0 | 18.0-22.0 |
| | Glycerin | 4.5-5.5 | 4.5-5.5 | 4.5-5.5 | 4.5-5.5 |
| First absorbance (320 nm) | | 0.22-0.26 | 0.23-0.27 | 0.16-0.18 | 0.18-0.22 |
| Second absorbance (429 nm) | | 0.19-0.23 | 0.46-0.56 | 0.15-0.17 | 0.35-0.41 |
| Specific phosphorous concentration [ppm] | | 5.4-6.0 | 1.8-2.2 | 5.4-6.0 | 1.0-1.1 |

TABLE 2

| | Composition | 5 | 6 | 7 | 8 |
|---|---|---|---|---|---|
| Ratio [% by maas] | Quinacridone pigment | 5.4-6.6 | 5.4-6.6 | 5.4-6.6 | 5.4-6.6 |
| | Resin R-A | 2.2-2.6 | 2.2-2.6 | 2.2-2.6 | — |
| | R-B | — | — | — | 2.2-2.6 |
| | Non-adsorbed resin rate | 45-55 | 32-38 | 36-44 | 27-33 |

TABLE 2-continued

| Composition | | 5 | 6 | 7 | 8 |
|---|---|---|---|---|---|
| | Surfactant | 0.2-0.4 | 0.2-0.4 | 0.2-0.4 | 0.2-0.4 |
| | TGME | 3.6-4.4 | 3.6-4.4 | 3.6-4.4 | 3.6-4.4 |
| | MPD | 18.0-22.0 | 18.0-22.0 | 18.0-22.0 | 18.0-22.0 |
| | Glycerin | 4.5-5.5 | 4.5-5.5 | 4.5-5.5 | 4.5-5.5 |
| First absorbance (320 nm) | | 0.36-0.40 | 0.29-0.35 | 0.32-0.38 | 0.23-0.27 |
| Second absorbance (429 nm) | | 0.72-0.80 | 0.33-0.39 | 0.72-0.80 | 0.46-0.56 |
| Specific phosphorous concentration [ppm] | | 5.4-6.0 | 1.8-2.2 | 5.4-6.0 | 1.8-2.2 |

<Ink Production Method>

A method for producing the ink of the first embodiment includes a pigment dispersion preparation process and a mixing process, for example. Preferably, the method for producing the ink further includes either or both an activated carbon treatment process and an ultrafiltration process as necessary. The activated carbon treatment process and the ultrafiltration process are preferably performed after the pigment dispersion preparation process and before the mixing process.

(Pigment Dispersion Preparation Process)

In the pigment dispersion preparation process, the quinacridone pigment, the resin, and the aqueous medium are mixed to yield a pigment dispersion. In order to sufficiently disperse the pigment particles, the pigment dispersion may further contain a surfactant. In the pigment dispersion, pigment particles constituted by the quinacridone pigment and the resin preferably have a $D_{50}$ of at least 70 nm and no greater than 130 nm.

The quinacridone pigment has a percentage content in the pigment dispersion of preferably at least 5% by mass and no greater than 25% by mass, and more preferably at least 10% by mass and no greater than 20% by mass. The resin has a percentage content in the pigment dispersion of preferably at least 2% by mass and no greater than 10% by mass, and more preferably at least 4% by mass and no greater than 8% by mass. When the pigment dispersion contains a surfactant, the surfactant has a percentage content in the pigment dispersion of preferably at least 0.1% by mass and no greater than 2% by mass, and more preferably at least 0.3% by mass and no greater than 1% by mass.

The pigment dispersion can be prepared by wet dispersion of the components contained in the aforementioned pigment dispersion using a media type wet disperser. Examples of the media type wet disperser include bead mills (specific examples include "NANO GRAIN MILL" produced by Asada Iron Works Co., Ltd., "MSC MILL" produced by Nippon Coke & Engineering Co., Ltd., and "DYNO (registered Japanese trademark) MILL produced by Willy A. Bachofen A G).

Wet dispersion using a media type wet disperser uses small-diameter beads (e.g., beads with a diameter of at least 0.5 mm and no greater than 1.0 mm) as a medium, for example. Changing the diameter of the beads can change the degree of dispersion of the pigment particles, the first absorbance of the supernatant, and the non-adsorbed resin rate. The $D_{50}$ of the pigment particles tends to be smaller as the diameter of the beads decreases. As the diameter of the beads is decreased, the cores containing the quinacridone pigment are easily coated with the resin and the first absorbance of the supernatant and the non-adsorbed resin rate tend to decrease. The material of the beads is not particularly limited and is preferably a hard material (e.g., glass or zirconia). The discharge amount of the media type wet disperser is at least 200 g/min and no greater than 600 g/min, for example. The first absorbance of the supernatant and the non-adsorbed resin rate tend to increase as the discharge amount in the media type wet disperser is increased.

(Activated Carbon Treatment Process)

In the activated carbon treatment process, the pigment dispersion is treated with activated carbon. Activated carbon treatment removes at least portions of the non-adsorbed resin and the intermediates. As a result of the ink containing a pigment dispersion such as above, the first absorbance and the second absorbance of the supernatant obtained from the ink can be easily adjusted to values within the desired ranges. The activated carbon treatment is performed for example by filtering the pigment dispersion under circulation using an activated carbon filter. The flow rate of the circulated pigment dispersion is at least 100 g/min and no greater than 300 g/min, for example. The time for which the pigment dispersion is circulated is at least 5 min and no greater than 30 min, for example. Assuming that one-time passing of 1000 g of the pigment dispersion through an activated carbon filter is taken to be one pass, the number of times of one pass (number of times of passing) in the activated carbon treatment is no greater than 5, for example.

(Ultrafiltration Process)

In the ultrafiltration process, the pigment dispersion is ultrafiltrated. Ultrafiltration removes at least portions of the phosphorous-containing catalyst, the non-adsorbed resin, and the intermediates. As a result of the ink containing a pigment dispersion such as above, the specific phosphorous concentration of the ink and the first absorbance and the second absorbance of the supernatant obtained from the ink can be easily adjusted to values within the desired ranges. In order to remove at least portions of the phosphorous-containing catalyst, the non-adsorbed resin, and the intermediates, an ultrafiltration membrane used for ultrafiltration preferably has a molecular weight cutoff selected from among molecular weight cutoffs that allow filtration of the phosphorous-containing catalyst, the non-adsorbed resin, and the intermediates and that disallow filtration of components of the pigment dispersion other than these. Furthermore, the molecular weight cutoff of the ultrafiltration membrane used for ultrafiltration is preferably larger than the molecular weights of the phosphorous-containing catalyst, the non-adsorbed resin, and the intermediates. In order to adjust the specific phosphorous concentration to a value within the desired range, the circulation time in ultrafiltration is preferably at least 0.4 hours. In order to reduce manufacturing cost, the circulation time in ultrafiltration is preferably no greater than 2.0 hours. Through ultrafiltration, a liquid containing at least portions of the phosphorous-containing catalyst, the non-adsorbed resin, and the intermediates is separated as a filtrate, and a liquid containing components of the pigment dispersion other than these is recirculated as a recovery liquid. The solid concentration of the pigment dispersion can be kept constant by adding water in an amount equal to the amount of the separated filtrate to the recovery liquid.

(Mixing Process)

In the mixing process, the pigment dispersion after either or both the activated carbon treatment process and ultrafiltration process and any components (e.g., further added aqueous medium and surfactant) added as necessary are mixed using a stirrer. Mixing of each component of the ink may be followed by removal of foreign matter and coarse particles using a filter (e.g., a filter with a pore diameter of no greater than 5 μm).

The pigment dispersion has a percentage content in all raw materials of the ink of at least 25% by mass and no greater than 60% by mass, for example. Note that the ink of the first embodiment can be favorably used in a later-described inkjet recording apparatus, for example.

Second Embodiment: Inkjet Ink Recording Apparatus

The following describes an inkjet recording apparatus according to a second embodiment of the present disclosure. The inkjet recording apparatus of the second embodiment includes a recording head and a conveyance section that conveys a recording medium. The recording head ejects the ink of the first embodiment toward the recording medium. Details of the inkjet recording apparatus of the second embodiment is described next with reference to the accompanying drawings. Note that the drawings to be referenced schematically illustrate elements of configuration in order to facilitate understanding, and therefore, properties such as the size and the number of each element of configuration illustrated in the drawings may differ from actual properties.

Figure 2:
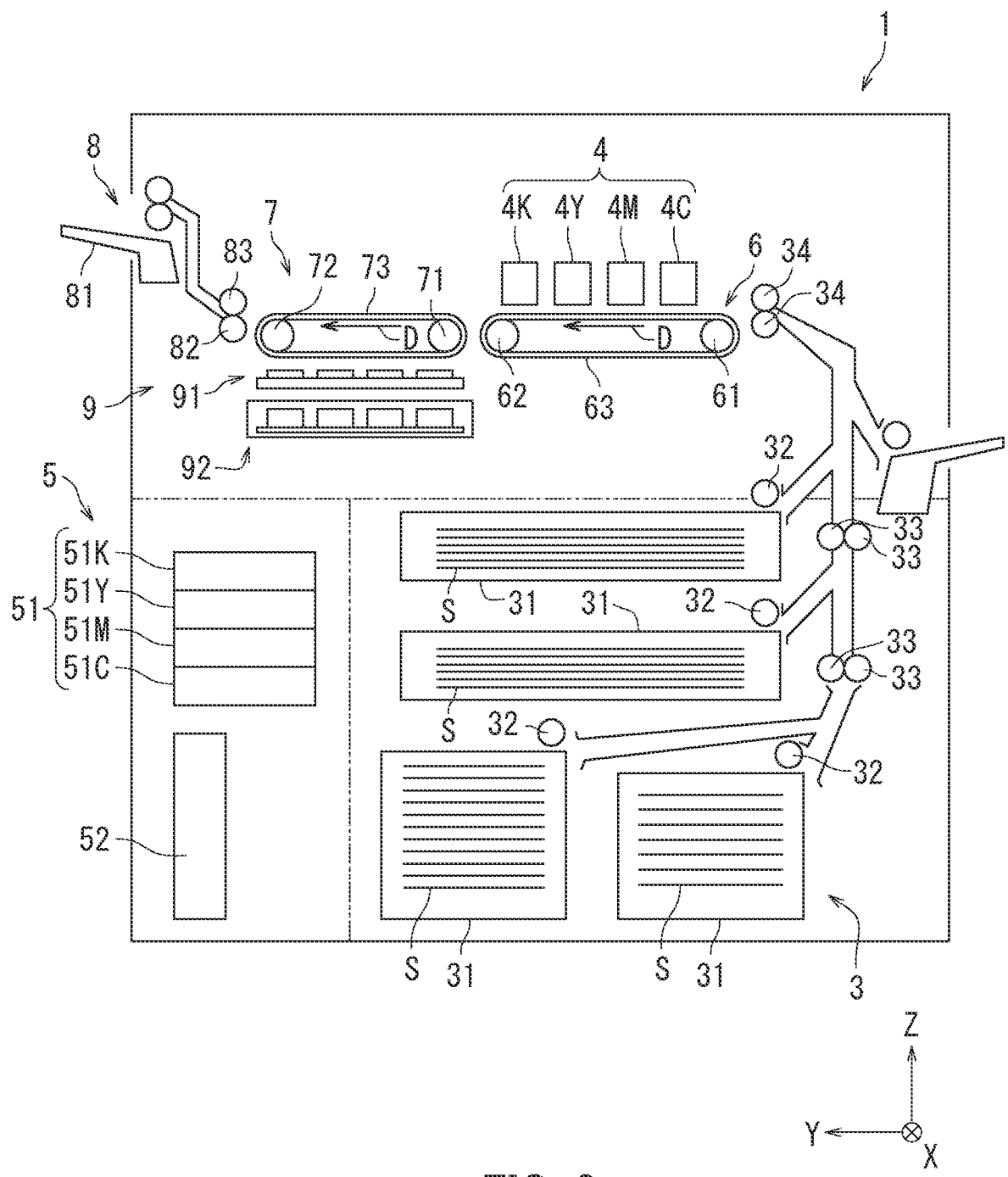
FIG. 2 is a diagram illustrating an example of an inkjet recording apparatus according to a second embodiment of the present disclosure.

FIG. 2 is a diagram illustrating a configuration of an inkjet recording apparatus 1 according to the second embodiment. The X axis, the Y axis, and the Z axis illustrated in FIG. 2 and FIGS. 3 to 5 described later are perpendicular to each other.

The inkjet recording apparatus 1 illustrated in FIG. 2 includes a sheet feed section 3, a first recording head 4C, a second recording head 4M, a third recording head 4Y, a fourth recording head 4K, a liquid accommodation section 5, a first conveyance section 6, a second conveyance section 7, an ejection section 8, and a maintenance section 9. In the following, the first to fourth recording heads 4C to 4K may be also referred to below simply as recording heads 4 where there is no need to distinguish them.

The sheet feed section 3 includes a plurality of sheet feed cassettes 31, a plurality of pickup rollers 32, a plurality of conveyance rollers 33, and a registration roller pair 34. Sheets S of a recording medium are stacked and accommodated in each of the sheet feed cassettes 31. The pickup rollers 32 pick up sheets S of the recording medium accommodated in the sheet feed cassettes 31 one at a time. The conveyance rollers 33 convey the sheet S picked out by a corresponding one of the pickup rollers 32. The registration roller pair 34 temporarily holds the sheet S of the recording medium conveyed by the conveyance rollers 33, and then supplies the sheet S to the first conveyance section 6 at a predetermined timing.

The recording heads 4 are disposed above a first conveyor belt 63. The first to fourth recording heads 4C to 4K are disposed in the stated order in terms of a conveyance direction D of the sheet S of the recording medium. The first to fourth recording heads 4C to 4K are located at the same height. Respective inks with four mutually different colors (e.g., cyan, magenta, yellow and black) are loaded in the first to fourth recording heads 4C to 4K. The ink loaded in the second recording head 4M is the ink of the first embodiment with magenta color. The recording heads 4 eject the inks toward the sheet S of the recording medium. Of the recording heads 4, the second recording head 4M ejects an ink with magenta color, which is the ink of the first embodiment, toward the sheet S of the recording medium. As a result, an image (e.g., a color image) is formed on the sheet S of the recording medium conveyed by the first conveyor belt 63.

Use of the ink of the first embodiment in the inkjet recording apparatus 1 of the second embodiment can inhibit occurrence of skewed ink ejection from the second recording head 4M and can form images with excellent scratch resistance for the same reasons as described in the first embodiment. Furthermore, the ink of the first embodiment has excellent re-solubility. Therefore, the inkjet recording apparatus 1 of the second embodiment using the ink of the first embodiment is excellent in cleaning ability.

The liquid accommodation section 5 includes a first ink tank 51C, a second ink tank 51M, a third ink tank 51Y, a fourth ink tank 51K, and a cleaning liquid tank 52. In the following, the first to fourth ink tanks 51C to 51K may be also referred to below simply as ink tanks 51 where there is no need to distinguish them. The first to fourth ink tanks 51C to 51K store the respective inks with four mutually different colors (e.g., cyan, magenta, yellow, and black). The ink stored in the second ink tank 51M is the ink of the first embodiment with magenta color. The first to fourth ink tanks 51C to 51K supply the inks to the first to fourth recording heads 4C to 4K, respectively. The cleaning liquid tank 52 supplies a cleaning liquid to liquid impregnating bodies 91.

The first conveyance section 6 is disposed downstream of the sheet feed section 3 in terms of the conveyance direction D of the sheet S of the recording medium. The first conveyance section 6 includes a first driven roller 61, a first drive roller 62, and a first conveyor belt 63. The first drive roller 62 is disposed downstream of the first driven roller 61 in terms of the conveyance direction D of the sheet S of the recording medium. The first conveyor belt 63 is an endless belt wound between the first driven roller 61 and the first drive roller 62. The first drive roller 62 is rotationally driven in the anticlockwise direction in FIG. 2. This causes the first drive roller 62 to circulate the first conveyor belt 63. Circulation of the first conveyor belt 63 conveys to the second conveyance section 7 the sheet S of the recording medium fed from the sheet feed section 3 in the conveyance direction D. The first driven roller 61 follows the rotation of the first drive roller 62 to rotate through the first conveyor belt 63.

The second conveyance section 7 is disposed downstream of the first conveyance section 6 in terms of the conveyance direction D of the sheet S of the recording medium. The second conveyance section 7 includes a second driven roller 71, a second drive roller 72, and a second conveyor belt 73. The second drive roller 72 is disposed downstream of the second driven roller 71 in terms of the conveyance direction D of the sheet S of the recording medium. The second conveyor belt 73 is an endless belt wound between the second driven roller 71 and the second drive roller 72. The second drive roller 72 is rotationally driven in the anticlockwise direction in FIG. 2. This causes the second drive roller 72 to circulate the second conveyor belt 73. Circulation of the second conveyor belt 73 conveys to the ejection section 8 the sheet S of the recording medium conveyed from the first conveyance section 6 in the conveyance direction D.

The second driven roller 71 follows the rotation of the second drive roller 72 to rotate through the second conveyor belt 73.

The ejection section 8 is disposed downstream of the second conveyance section 7 in terms of the conveyance direction D of the sheet S of the recording medium. The ejection section 8 includes an exit tray 81, an ejection drive roller 82, and an ejection driven roller 83. The ejection drive roller 82 and the ejection driven roller 83 are in pressure contact with each other at a location opposite to each other. The ejection drive roller 82 is rotationally driven in the anticlockwise direction in FIG. 2. The ejection driven roller 83 follows the rotation of the ejection drive roller 82 to rotate. In the above configuration, the ejection drive roller 82 and the ejection driven roller 83 eject the sheet S of the recording medium conveyed from the second conveyance section 7 onto the exit tray 81. The ejected sheet S of the recording medium is placed on the exit tray 81.

The maintenance section 9 includes liquid impregnating bodies 91 and cleaning members 92. The liquid impregnating bodies 91 are impregnated with the cleaning liquid. The liquid impregnating bodies 91 come into contact with ejection surfaces 42 (see FIG. 3) of the recording heads 4 to supply the cleaning liquid to the ejection surfaces 42. The liquid impregnating bodies 91 each are sponge, non-woven fabric, or an absorbent sheet, for example. The cleaning members 92 wipe the ejection surfaces 42 of the recording heads 4. Wiping by the cleaning members 92 clean ink attached to the ejection surfaces 42. The cleaning members 92 each are a rubber wiper, for example.

Examples of the cleaning liquid include water, polyhydric alcohols, triethylene glycol monobutyl ether, lactam, and mixed liquids of polyhydric alcohols. Preferably, the percentage content of water, the percentage content of a polyhydric alcohol, the percentage content of triethylene glycol monobutyl ether, the percentage content of lactam, and the percentage content of a mixed liquid of polyhydric alcohols in the cleaning liquid are respectively at least 60% by mass and no greater than 70% by mass, at least 10% by mass and no greater than 15% by mass, at least 5% by mass and no greater than 10% by mass, at least 5% by mass and no greater than 10% by mass, and at least 1% by mass and no greater than 5% by mass. An example of a cleaning liquid with such a composition is a cleaning liquid for head cleaning use for TASKalfa Pro 15000c produced by KYOCERA Document Solutions Inc.

Figure 3:
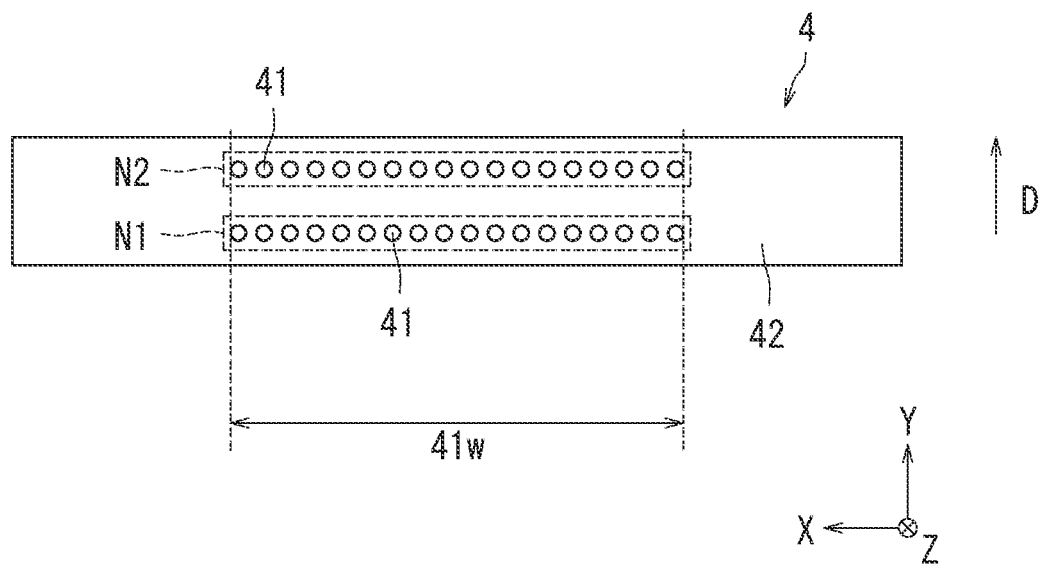
FIG. 3 is a diagram illustrating the lower surface of a recording head illustrated in FIG. 2.

Next, the recording heads 4 are further described with reference to FIG. 3. FIG. 3 is a diagram illustrating the lower surface of a recording head 4 illustrated in FIG. 2.

As illustrated in FIG. 3, the recording head 4 has a first nozzle row N1, a second nozzle row N2, and an ejection surface 42. In order to facilitate understanding, the first nozzle row N1 and the second nozzle raw N2 are each encircled by a broken line in FIG. 3. The first nozzle row N1 and the second nozzle row N2 each include a plurality of nozzles 41. The nozzles 41 eject an ink toward the sheet S of the recording medium. The nozzles 41 open at the ejection surface 42. The first nozzle row N1 and the second nozzle row N2 are arranged side by side in terms of the conveyance direction D of the sheet S of the recording medium. The nozzles 41 are spaced from each other in a direction perpendicular to the conveyance direction D of the sheet S of the recording medium in each of the first nozzle row N1 and the second nozzle row N2. The recording head 4 is a line head, for example.

The first nozzle row N1 and the second nozzle row N2 each have a width 41$w$ (i.e., a width of an area on which the recording head 4 is capable of performing recording) that is equal to or larger than the width of the sheet S of the recording medium. As such, the recording head 4 can perform image recording on the sheet S of the recording medium conveyed on the first conveyor belt 63 in a fixed state. That is, the inkjet recording apparatus 1 adopts a single-pass scheme that is a scheme without performing shuttle movement. As a result of including the above-described recording heads 4, the inkjet recording apparatus 1 of the second embodiment can perform printing at higher speed than an inkjet recording apparatus including a serial head.

Figure 4:
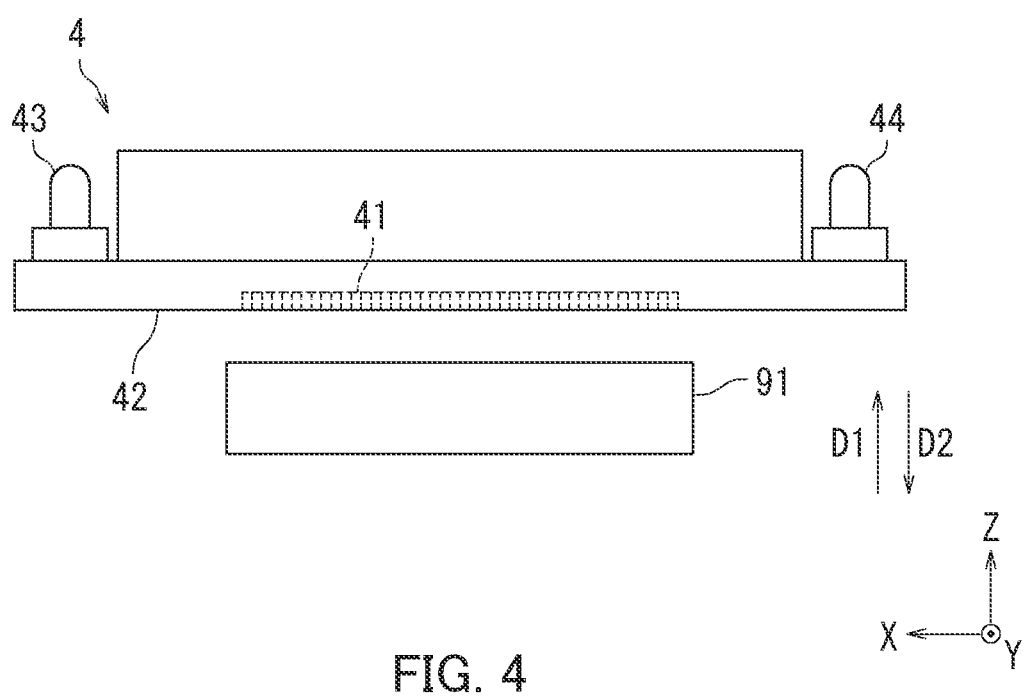
FIG. 4 is a diagram explaining a cleaning liquid supply operation.
Figure 5:
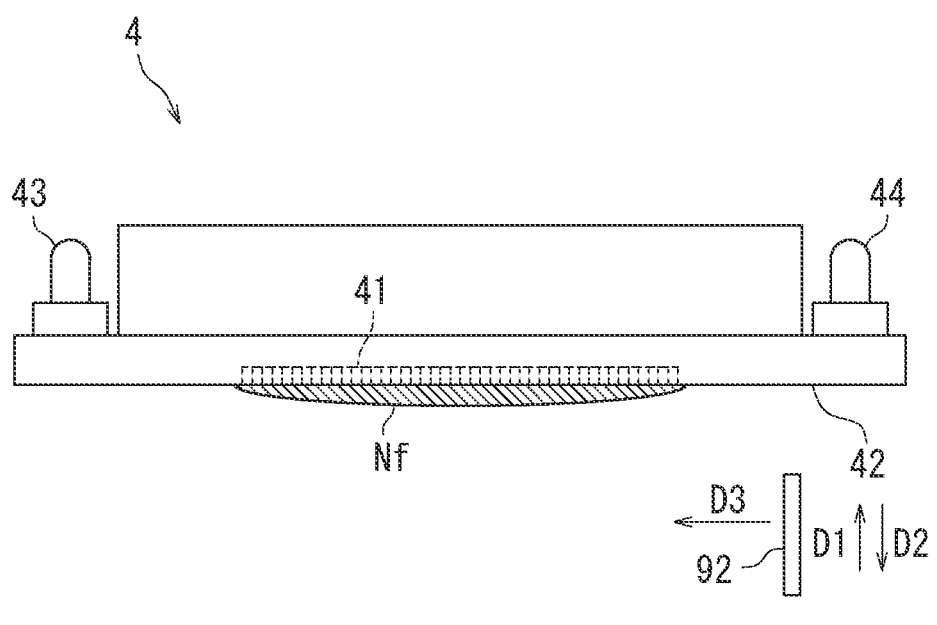
FIG. 5 is a diagram explaining a purging operation and a wiping operation.

With reference to FIGS. 4 and 5, a cleaning operation by the maintenance section 9 is described next. The cleaning operation includes a cleaning liquid supply operation, a purging operation, and a wiping operation. FIG. 4 is a diagram explaining the cleaning liquid supply operation. FIG. 5 is a diagram explaining the purging operation and the wiping operation. Note that although the nozzles 41 are not viewed in a side view of a recording head 4, the position of the nozzles 41 is indicated by broken lines in FIGS. 4 and 5 for easy understanding.

As illustrated in FIG. 4, the recording head 4 further includes an ink inlet 43 and an ink outlet 44. The ink flows into the recording head 4 through the ink inlet 43 from the ink tank 51 and flows out of the recording head 4 through the ink outlet 44.

As illustrated in FIG. 2, the liquid impregnating bodies 91 of the maintenance section 9 are disposed below the second conveyor belt 73. The cleaning members 92 of the maintenance section 9 are disposed below the liquid impregnating bodies 91. The liquid impregnating bodies 91 and the cleaning members 92 are moveable between a location opposite to the second conveyance section 7 and a location opposite to the ejection surfaces of the recording heads 4. Furthermore, the liquid impregnating bodies 91 are movable both in an ascending direction D1 and a descending direction D2 as illustrated in FIG. 4. The cleaning members 92 are movable in the ascending direction D1, the descending direction D2, and a wiping direction D3 as illustrated in FIG. 5. The "ascending direction D1" is a direction approaching the ejection surfaces 42 in the Z-axis direction. The "descending direction D2" is a direction away from the ejection surfaces 42 in the Z-axis direction. The "wiping direction D3" is a direction along the ejection surfaces 42. The liquid impregnating bodies 91 and the cleaning members 92 are moved by known drive mechanisms (not illustrated).

Here, ink attached to the ejection surfaces 42 may dry and adhere to the ejection surfaces 42. In order to clean such dried ink, the cleaning operation is performed.

First, the cleaning liquid supply operation of the creating operation is described. The liquid impregnating bodies 91 are impregnated with the cleaning liquid. Next, the liquid impregnating bodies 91 move to a location opposite to the ejection surfaces 42, and then move in the ascending direction D1 as illustrated in FIG. 4. Thereafter, the liquid impregnating bodies 91 are pushed against the ejection surfaces 42. In the manner described above, the cleaning liquid impregnated in the liquid impregnating bodies 91 is attached to the ejection surfaces 42. The state in which the liquid impregnating bodies 91 are pushed against the ejection surfaces 42 is preferably kept for a specific time. The specific time is preferably at least 1 second and no greater than 5 minutes. Once the specific time elapses, the liquid impregnating bodies 91 move in the descending direction D2. As a result, the state in which the liquid impregnating bodies 91 are pushed against the ejection surfaces 42 is released.

Next, the purging operation is described. As illustrated in FIG. 5, the ink is purged from each recording head 4. In FIG. 5, the ink (purging ink) purged is indicated with a reference sign "Nf" affixed thereto. Specifically, the ink is forcedly discharged from the nozzles 41 by pressure application in the recording head 4. This releases clogging and the like of the nozzles 41 and causes the purging ink Nf to attach to the ejection surfaces 42 of the recording heads 4.

Next, the wiping operation is described. The cleaning members 92 having moved to a location (location illustrated in FIG. 5) opposite to the ejection surfaces 42 move in the ascending direction D1. Thereafter, the cleaning members 92 are pushed against the ejection surfaces 42. The cleaning members 92 move in a direction (wiping direction D3 in FIG. 5) along the ejection surfaces 42 with them being pushed against the ejection surfaces 42. This allows the cleaning members 92 to wipe the ejection surfaces 42. As a result, ink (e.g., dried ink and the purging ink Nf) attached to the ejection surfaces 42 is removed together with the cleaning liquid. Thus, the ejection surfaces 42 of the recording heads 4 are cleaned. Next, the cleaning members 92 move in the descending direction D2. As a result, the state in which the cleaning members 92 are pushed against the ejection surfaces 42 is released.

The ink of the first embodiment has excellent re-solubility. Therefore, even ink that has attached to and dried on the ejection surfaces 42 of the recording heads 4 is easily dissolved in the purging ink Nf and the cleaning liquid. Therefore, the inkjet recording apparatus 1 of the second embodiment using the ink of the first embodiment has excellent cleaning ability on the ejection surfaces of the recording heads 4.

The inkjet recording apparatus 1 being an example of the inkjet recording apparatus of the second embodiment has been described so far. However, the inkjet recording apparatus of the second embodiment is not limited to the inkjet recording apparatus 1. The inkjet recording apparatus of the second embodiment may adopt a multi-pass scheme. Furthermore, the number of the nozzles 41, the intervals between the nozzles 41, and the positional relationship among the nozzles 41 in the first to fourth recording heads 4C to 4K may be set as appropriate according to the specification of the apparatus. The cleaning liquid supply operation may be any of cleaning liquid ejection by inkjetting, cleaning liquid application using a roller, and cleaning liquid spraying. Furthermore, the cleaning liquid supply operation, the purging operation, the wiping operation may each be repeated. The order of the cleaning liquid supply operation and the purging operation is not limited. The cleaning members 92 may move back and forth in a direction along the ejection surfaces 42. For example, it is possible that the cleaning members 92 being pushed against the ejection surfaces 42 move in a first direction (the wiping direction D3 in FIG. 5) along the ejection surfaces 42, and then move in a second direction (direction opposite to the wiping direction D3 in FIG. 5) opposite to the first direction along the ejection surfaces 42.

EXAMPLES

The following describes examples of the present disclosure. However, the present disclosure is not limited to the following examples. Note that ion exchange water may be referred to simply as water in the following examples.

[Resin Preparation]

First, resins (R-A) and (R-B) to be used for ink preparation were prepared. Table 3 shows the types, ratio, mass average molecular weight, and acid value of each of the repeating units of the resin (R-A) and (R-B).

TABLE 3

| | Resin | | | |
|---|---|---|---|---|
| | | Repeating unit | Mass average molecular | Acid value |
| Type | Type | ratio | weight | [mgKOH/g] |
| R-A | MAA/MMA/BA/ST | 8.1/30.0/30.0/31.9 | 20000 | 100 |
| R-B | MAA/MMA/BA/ST | 10.6/40.0/20.0/29.4 | 20000 | 130 |

The terms in Table 3 mean as follows. "MAA" means a repeating unit derived from methacrylic acid. "MMA" means a repeating unit derived from methyl methacrylate. "BA" means a repeating unit derived from butyl acrylate. "ST" means a repeating unit derived from styrene. "Ratio" means a ratio of the mass of each repeating unit to the mass of all repeating units of a corresponding resin.

<Measurement of Resin Acid Value>

The acid value of each resin was measured in accordance with the Japanese Industrial Standards (JIS) K0070:1992.

<Measurement of Resin Mass Average Molecular Weight>

The mass average molecular weight of each resin was measured under the following measurement conditions using a gel permeation chromatography ("HLC-8020GPC", product of Tosoh Corporation). A calibration curve was plotted using n-propylbenzene and seven selected TSKgel Standard Polystyrenes. The TSKgel Standard Polystyrenes were F-40, F-20, F-4, F-1, A-5000, A-2500, and A-1000 each produced by Tosoh Corporation.

(Conditions for Mass Average Molecular Weight Measurement)

Column: "TSKgel Super Multipore HZ-H" produced by Tosoh Corporation (semi-microcolumn with 4.6 mm ID×15 cm)

Number of columns: 3

Eluent: tetrahydrofuran

Flow rate: 0.35 mL/min

Sample injection amount: 10 μL

Measurement temperature: 40° C.

Detector: refractive index (RI) detector

[Preparation of Inks (I-1), (I-3), (I-5), (I-7), (I-8), and (I-12)]

Inks (I-1), (I-3), (I-5), (I-7), (I-8), and (I-12) shown in Table 4 were prepared according to the following methods. Table 4 shows a condition for dispersion treatment, a condition for activated carbon treatment, the non-adsorbed resin rate, the first absorbance, the second absorbance, and the specific phosphorous concentration of each of these inks. Note that ultrafiltration treatment was not carried out in the preparation of these inks.

TABLE 4

|  | Ink | Dispersion treatment Discharge amount [g/min] | Activated carbon treatment Number of times of passing [times] | Non-absorbed resin rate [% by mass] | First absorbance (320 nm) | Second absorbance (429 nm) | Specific phosphorous concentration [ppm] |
| --- | --- | --- | --- | --- | --- | --- | --- |
| Comparative Example 1 | I-7 | 800 | — | 55 | 0.50 | 0.80 | 6.0 |
| Example 5 | I-5 | 700 | — | 50 | 0.40 | 0.80 | 6.0 |
| Example 1 | I-1 | 700 | 1 | 30 | 0.24 | 0.21 | 6.0 |
| Example 3 | I-3 | 700 | 5 | 20 | 0.16 | 0.15 | 6.0 |
| Comparative Example 2 | I-8 | 700 | 10 | 15 | 0.12 | 0.15 | 6.0 |
| Comparative Example 6 | I-12 | 800 | 15 | 20 | 0.16 | 0.13 | 6.0 |

In Table 4, "-" indicates that activated carbon treatment was not carried out. In Table 4 and Table 7 described later, "320 nm" indicates that the first peak was confirmed at a wavelength of 320 nm and "429 nm" indicates that the second peak was confirmed at a wavelength of 429 nm.

<Preparation of Ink (I-1)>
(Pigment Dispersion Preparation)

A pigment dispersion was prepared so as to achieve a mixing ratio d-a shown in Table 5.

TABLE 5

| Pigment dispersion | Ratio d-a [part by mass] |
| --- | --- |
| Water | Rest |
| Resin (R-A) | 6.0 |
| Sodium hydroxide | Specific amount |
| Pigment PR-122 | 15.0 |
| Olfine E1010 | 0.5 |
| Total | 100.0 |

The terms in Table 5 mean as follows. "Pigment PR-122" means a quinacridone pigment (C.I. Pigment Red 122). "Olfine E1010" means a nonionic surfactant ("OLFINE (registered Japanese trademark) E1010", product of Nissin Chemical Industry Co., Ltd., contents: ethylene oxide adduct of acetylenediol, active component concentration: 100% by mass, HLB value: 13.5±0.5).

First, 6.0 parts by mass of the resin (R-A) and a sodium hydroxide aqueous solution were mixed. The sodium hydroxide aqueous solution contained a specific amount of sodium hydroxide. The "specific amount" being an amount of sodium hydroxide added in Table 5 indicates 1.05 times the amount necessary for equivalent neutralization of the resin (R-A). As such, the resin (R-A) was neutralized with an equivalent amount (strictly, 105% equivalent amount) of sodium hydroxide to obtain an aqueous solution I containing the resin (R-A).

A vessel was charged with the full amount of the resultant aqueous solution I, 15.0 parts by mass of the quinacridone pigment (C.I. Pigment Red 122), 0.5 parts by mass of the nonionic surfactant ("OLFINE (registered Japanese trademark) E1010", product of Nissin Chemical Industry Co., Ltd.), and the remaining amount of water. The vessel contents were mixed using a media type wet disperser ("DYNO (registered Japanese trademark)-MILL", product of Willy A. Bachofen AG (WAB)) to obtain a mixed liquid II.

Note that "Rest" being an amount of water added in Table 5 means the amount by which the mixed liquid II becomes 100.0 parts by mass. The remaining amount of water in Table 5 is a total amount of water added to the vessel and water contained in the aqueous solution I (in detail, water contained in the sodium hydroxide aqueous solution used for resin neutralization and water produced by the neutralization reaction between the resin and sodium hydroxide).

Subsequently, dispersion treatment was carried out on the vessel contents using zirconia beads (particle diameter 0.5 mm) as a medium and a bead mill ("NANO GRAIN MILL", product of Asada Iron Works Co., Ltd.). Conditions for the dispersion treatment using the bead mill included a temperature of 10° C., a peripheral speed of 8 msec, and a discharge amount of 700 g/min. Through the above, a pigment dispersion III was obtained.

It was confirmed that pigment particles with a volume median diameter in the range of 70 nm to 130 nm have been dispersed in the pigment dispersion III. The volume median diameter of the pigment particles was measured using a dynamic light scattering type particle size distribution analyzer ("ZETASIZER NANO (registered Japanese trademark) ZS", product of Malvern Instruments Ltd.) with a dilution used as a measurement sample. Here, the dilution was obtained by diluting the pigment dispersion III 300 times with water.

(Activated Carbon Treatment)

Activated carbon treatment was carried out on the resultant pigment dispersion III. In detail, 1800 g of the pigment dispersion III under circulation at a flow rate of 190 g/min was filtered using an activated carbon filter ("YCC-1L", product of Nihon Filter Co., Ltd., type of activated carbon: granular coconut shell activated carbon). In the following, passing of 1000 g of the pigment dispersion III through the activated carbon filter is indicated as one pass. The flow rate was 190 g/min. Therefore, the time required for one pass was 5 minutes and 15 seconds (=(1000 g)/(190 g/min). After one pass, circulation of the pigment dispersion III was stopped and a pigment dispersion IV after the activated carbon treatment was obtained. As such, the number of times of one pass (number of times of passing) in the activated carbon treatment was 1.

(Ink Preparation)

The ink (I-1) was prepared so as to have a mixing ratio i-a shown in Table 6.

TABLE 6

| Ink | Mixing ratio i-a [part by mass] |
|---|---|
| Pigment dispersion | 40.0 |
| Surfynol 420 | 0.3 |
| Triethylene glycol monobutyl ether | 4.0 |
| 3-Methyl-1,5-pentanediol | 20.0 |
| Glycerin | 5.0 |
| Water | Rest |
| Total | 100.0 |

The terms in Table 6 mean as follows. "Surfynol 420" means a nonionic surfactant (SURFYNOL (registered Japanese trademark) 420", product of Nissin Chemical Industry Co., Ltd., contents: ethylene oxide adduct of acetylene glycol, active component concentration 100% by mass, HLB value: 4).

First, water was added into a flask equipped with a stirrer ("THREE-ONE MOTOR (registered Japanese trademark) BL-600", product of Shinto Scientific Co., Ltd.). The pigment dispersion IV after the activated carbon treatment, the nonionic surfactant (SURFYNOL (registered Japanese trademark) 420", product of Nissin Chemical Industry Co., Ltd.), triethylene glycol monobutyl ether, 3-methyl-1,5-pentanediol, and glycerin were added to the flask while the flask contents were stirred at a stirring speed of 400 rpm using the stirrer, thereby obtaining a mixed liquid V. The amount of each raw material added was as shown in Table 6. Note that "Rest" being an amount of water added in Table 6 means the amount by which the mixed liquid V becomes 100.0 parts by mass. The mixed liquid V was filtered using a filter with a pore size of 5 μm to remove foreign matter and coarse particles from the mixed liquid V. Through the above, the ink (I-1) was obtained.

<Preparation of Inks (I-3), (I-5), (I-7), (I-8), and (I-12)>

Inks (I-3), (I-8), and (I-12) were prepared according to the same method as that for preparing the ink (I-1) in all aspects other than that the discharge amount in the dispersion treatment and the number of times of passing in the activated carbon treatment were changed as shown above in Table 4. Inks (I-5) and (I-7) were prepared according to the same method as that for preparing the ink (I-1) in all aspects other than that the discharge amount in the dispersion treatment was changed as shown above in Table 4 and the activated carbon treatment was not carried out.

[Measurement]

According to the following method, a measurement target (each of the inks (I-1), (I-3), (I-5), (I-7), (I-8), and (I-12)) was centrifugated. Thereafter, the first absorbance, the second absorbance, the specific phosphorous concentration, and the non-adsorbed resin rate of each of the resultant supernatants were measured. Measurement results are shown above in Table 4.

<Centrifugation>

In an environment at 23° C., 2 g of the measurement target sealed in a vessel was centrifuged at a rotational speed of 140,000 rpm (corresponding to a centrifugal force of 1,050,000 G) for 3 hours using an ultra centrifuge ("HIMAC (registered Japanese trademark) CS150FNX", product of Eppendorf Himac Technologies Co., Ltd., rotor: S140AT). The centrifugation precipitated pigment particles contained in the measurement target.

<Measurement of First Absorbance and Second Absorbance>

The full amount of the supernatant contained in the measurement target after the centrifugation was collected using a syringe. The collected supernatant was diluted 25 times with water and the resultant dilution was taken to be a measurement sample. The measurement sample (i.e., the supernatant) set in a cell was measured under the following conditions using a spectrophotometer ("U-3000", product of Hitachi High-Tech Science Corporation) to plot an ultraviolet-visible absorption spectrum of the measurement sample. The first absorbance and the second absorbance of the supernatant were obtained from the plotted ultraviolet-visible absorption spectrum.

(Conditions for Absorbance Measurement)
Measured wavelength range: range of 200 nm to 800 nm
Scanning speed: 300 nm/min
Sampling interval: 1 nm
Slit width: 1 nm
Cell: quartz glass cell
Optical path length: 10 mm
Beam method: double beam
Baseline measurement: done
Reference: water <Measurement of Specific Phosphorous Concentration>

Using a syringe, 1 mL of the supernatant contained in the measurement target after the centrifugation was collected. The collected supernatant was diluted 50 times with water and the resultant dilution was taken to be a measurement sample. Mass analysis of the measurement sample was carried out using a high-frequency inductively coupled plasma (ICP) mass spectrograph ("iCAP PRO ICP-OES Duo", product of Thermo Fisher Scientific K.K.). The phosphorous concentration (unit: ppm) in the 50-fold dilution of the supernatant was obtained from the measurement value. Note that a calibration curve plotted using a sample with a known phosphorous concentration was used in obtaining the phosphorous concentration.

<Measurement of Non-adsorbed Resin Rate>

The full amount of the supernatant contained in the measurement target after the centrifugation was collected. Next, the full amount of the collected supernatant was added into a disposable cup and subjected to reduced pressure drying at 60° C. for 24 hours, thereby obtaining a residue. The mass (WA) of the residue was measured. The mass (WA) of the residue was taken to be a mass of a non-adsorbed resin.

Using the following equation, a mass (WD) of the resin contained in 2 g of the measurement target was calculated from a percentage content B (=6.0% by mass) of the resin (R-A) in the pigment dispersion read from Table 5 and a percentage content C(=by mass) of the pigment dispersion in the ink read from Table 6.

$$WD = 2 \times (C/100) \times (B/100)$$

Thereafter, a non-adsorbed resin rate was calculated using the following equation from the mass (WA) of the residue obtained from 2 g of the measurement target and the mass (WD) of the resin contained in 2 g of the measurement target.

$$\text{Non-adsorbed resin rate [\% by mass]} = 100 \times WA/WD$$

[Preparation of Inks (I-2), (I-4), (I-6), (I-9), (I-10), (I-11), (I-13), and (I-14)]

Inks (I-2), (I-4), (I-6), (I-9), (I-10), (I-11), (I-13), and (I-14) shown in Table 7 were prepared according to the following methods. Table 7 shows conditions for the dispersion treatment, conditions for the ultrafiltration treatment, the non-adsorbed resin rate, the first absorbance, the second absorbance, and the specific phosphorous concentration of each of these inks. Note that the activated carbon treatment was not carried out in the preparation of these inks.

C.I. Pigment Violet 19 was used as the quinacridone pigment in place of C.I. Pigment Red 122.

<Preparation of Ink (I-9)>

The ink (I-9) was prepared according to the same method as that for preparing the ink (I-2) in all aspects other than that the ultrafiltration treatment was not carried out and C.I.

TABLE 7

|  | Ink | Dispersion treatment Discharge amount [g/min] | Ultrafiltration treatment Circulation time [min] | Non-adsorbed resin rate [% by mass] | First absorbance (320 nm) | Second absorbance (429 nm) | Specific phosphorous concentration [ppm] | Remarks |
|---|---|---|---|---|---|---|---|---|
| Comparative Example 3 | I-9 | 700 | — | 50 | 0.40 | 0.80 | 8.0 | *1 |
| Comparative Example 5 | I-11 | 700 | — | 50 | 0.40 | 0.90 | 6.0 | *2 |
| Example 7 | I-13 | 700 | 30 | 40 | 0.35 | 0.80 | 6.0 | |
| Example 2 | I-2 | 700 | 60 | 30 | 0.25 | 0.51 | 2.0 | |
| Example 4 | I-4 | 700 | 90 | 25 | 0.20 | 0.38 | 1.0 | |
| Comparative Example 4 | I-10 | 700 | 120 | 20 | 0.16 | 0.26 | 0.8 | |
| Example 6 | I-6 | 700 | 60 | 35 | 0.32 | 0.36 | 2.0 | *3 |
| Example 8 | I-14 | 700 | 60 | 30 | 0.25 | 0.51 | 2.0 | *4 |

*1: A quinacridone pigment from a production lot with low intermediate content and high phosphorous content was used.
*2: A quinacridone pigment from a production lot with high intermediate content and low phosphorous content was used.
*3: C.I. Pigment Violet 19 was used as the quinacridone pigment.
*4: Resin (R-B) was used as the resin.

In Table 7, "-" indicates that the ultrafiltration treatment was not carried out.

<Preparation of Ink (I-2)>

The ink (I-2) was prepared according to the same method as that for preparing the ink (I-1) in all aspects other than that ultrafiltration treatment was carried out according to the following method in place of the activated carbon treatment.

(Ultrafiltration Treatment)

The pigment dispersion III obtained above in "Pigment Dispersion Preparation" was filtered by a vibration ultrafiltration method. In detail, using an ultrafiltration membrane ("AHP-0013D", product of Asahi Kasei Corp., pencil type module, material of hollow fiber membrane: polyacrylonitrile, membrane inner diameter: 0.8 mm, effective membrane area: 170 cm 2), 480 g of the pigment dispersion III was circulated at a flow rate of 390 g/min for 60 minutes under a condition of an inner pressure applied to the ultrafiltration membrane of 50 kPa. That is, the circulation time was 60 minutes. Through the ultrafiltration, a liquid containing at least portions of the non-adsorbed resin, the intermediates, and the phosphorous-containing catalyst in the pigment dispersion III was filtered out as a filtrate and the other liquid was re-circulated as a recovery liquid. The solid concentration of the pigment dispersion was kept constant by adding water in an amount equal to the amount of the filtered-out filtrate to the recovery liquid. In the manner described above, a pigment dispersion VI after the ultrafiltration was obtained. The pigment dispersion VI was used in "Ink Preparation" described above in place of the pigment dispersion IV.

<Preparation of Inks (I-4), (I-10), and (I-13)>

The inks (I-4), (I-10), and (I-13) were prepared according to the same method as that for preparing the ink (I-2) in all aspects other than that the circulation time in the ultrafiltration was changed as shown above in Table 7.

<Preparation of Ink (I-6)>

The ink (I-6) was prepared according to the same method as that for preparing the ink (I-2) in all aspects other than that Pigment Red 122 from a production lot with low intermediate content and high phosphorous content was used as the quinacridone pigment.

<Preparation of Ink (I-11)>

The ink (I-11) was prepared according to the same method as that for preparing the ink (I-2) in all aspects other than that the ultrafiltration treatment was not carried out and C.I. Pigment Red 122 from a production lot with high intermediate content and low phosphorous content was used as the quinacridone pigment.

<Preparation of Ink (I-14)>

The ink (I-14) was prepared according to the same method as that for preparing the ink (I-2) in all aspects other than that the resin (R-B) was used as the resin in place of the resin (R-A).

[Measurement]

The first absorbance, the second absorbance, the specific phosphorous concentration, and the non-adsorbed resin rate were measured for each supernatant obtained from the measurement targets (the inks (I-2), (I-4), (I-6), (I-9), (I-10), (I-11), (I-13), and (I-14)) according to the same method as that for measurement of the inks (I-1), (I-3), (I-5), (I-7), (I-8), and (I-12). Measurement results are shown above in Table 7.

[Evaluation]

With respect to each of the inks (I-1) to (I-14), occurrence or non-occurrence of skewed ink ejection from recording heads, scratch resistance of images formed with the ink, and re-solubility of the ink were evaluated. Evaluation results are shown below in Tables 8 and 9.

As an evaluation apparatus used for these evaluations, an inkjet recording apparatus (prototype of KYOCERA Document Solutions Japan Inc.) was used. The evaluation apparatus included a wiper and piezoelectric line heads with nozzles (radius of orifices: 10 µm) as recording heads. An evaluation target (any of the inks (I-1) to (I-14)) was loaded in a recording head for magenta ink of the evaluation apparatus. Plain paper ("C2", product of FUJIFILM Business Innovation Corp., A4-size plain paper copier (PPC) paper) was used as paper.

<Evaluation of Skewed Ejection>

Evaluation of skewed ink ejection from the recording heads was carried out in an environment at a temperature of 25° C. and a relative humidity of 60%. The temperature of each of the recording heads was set at 40° C. The ejection amount of ink per pixel was set to 3.5 pL. Using the evaluation apparatus, an image (20.5 mm×29.0 mm) for which image processing by ink ejection from all the nozzles of the recording heads has been set was consecutively printed on sheets of the paper for 1 hour. The image (initial image) printed first in the consecutive printing and the image (printing-resistance image) printed last in the consecutive printing were visually observed. The presence or absence of white lines in the initial image and the printing-resistance image was checked. The white lines are image defects resulting from skewed ink ejection from a recording head. Skewed ink ejection from the recording heads was evaluated according to the following criteria.

(Criteria of Skewed Ejection)

Good (A): The printing-resistance image included less white lines than the initial image.

Poor (B): The printing-resistance image included more white lines than the initial image.

<Evaluation of Scratch Resistance>

Evaluation of scratch resistance was carried out in an environment at a temperature of 25° C. and a relative humidity of 60%. The ink ejection amount per pixel was set to 11 pL. Using the evaluation apparatus, a solid image (4 cm×5 cm) was printed on a sheet (also referred to below as sheet A) of the paper. Next, a rubbing test described below was carried out. In the rubbing test, a sheet (also referred to below as sheet B) of unused paper was placed over the solid image printed on the sheet A. Next, a 1-kg weight was placed on the sheet B. Thereafter, the sheet B was rubbed back and forth 5 times against the solid image by moving the sheet B and the weight as one unit so that only the own weight of the weight was applied. After the rubbing test, the image densities were measured at 224 locations in an area of the sheet A where the solid image has not been formed using a reflectance densitometer ("RD-19", product of X-Rite Inc.). The average of the measured image densities was taken to be an evaluation value. An image with a small evaluation value indicates that the image has excellent scratch resistance with minimal color transfer due to rubbing. Scratch resistance of the image formed with the ink was evaluated according to the following evaluation criteria.

(Criterial of Scratch Resistance)

A (good): evaluation value of less than 0.020
B (poor): evaluation value of at least 0.020

<Evaluation of Re-Solubility>

With respect to each of the inks, 0.3 mL of the ink was placed on the tip end of a wiper of the evaluation apparatus, and left to stand for 10 minutes in an environment at a temperature of 25° C. and a relative humidity of 60%. Next, the ejection surface of each recording head was wiped in an outbound direction (a direction opposite to the wiping direction D3 in FIG. 5) using the wiper with the ink placed thereon to spread the ink over the ejection surface. The spread ink was dried at 45° C. for 4 days to form dried ink on the ejection surface.

After the formation of the dried ink, the cleaning operation was carried out using the evaluation apparatus. In detail, nonwoven cloth with 3 g of a cleaning liquid penetrated therein was allowed to be in close contact with the ejection surface of the recording head for 30 seconds (corresponding to the cleaning liquid supply operation). The cleaning liquid used was a cleaning liquid for head cleaning use for an inkjet color production printer, "TASKalfa Pro 15000c" produced by KYOCERA Document Solutions Inc. The nonwoven cloth used was cut cloth of "BEMCOT (registered Japanese trademark) M-3II" produced by Asahi Kasei Corp. Next, the nonwoven cloth was separated from the ejection surface of the recording head. Next, 0.3 mL of the ink was forcedly discharged (purged) from the recording head (corresponding to the purging operation). Next, the ejection surface of the recording head was wiped in the return direction (wiping direction D3 in FIG. 5) using the wiper (corresponding to the wiping operation). By the wiping, the dried ink attached to the ejection surface of the recording head was removed together with the cleaning liquid and the purging ink. Details of the cleaning operation carried out in the present test was almost the same as the cleaning operation described with reference to FIGS. 4 and 5. Next, the ejection surface of the recording head was visually observed to check the presence or absence of remaining dried ink that had not been cleaned. Note that the more easily the dried ink dissolves in the cleaning solution and purging ink, the more easily it tends to be removed from the ejection surface of the recording head. Re-solubility of the inks was evaluated according to the following evaluation criteria.

(Criteria of Re-solubility)

Good (A): No dried ink was observed on the ejection surface of the recording head.

Mediocre (B): A slight amount of dried ink was observed on the ejection surface of the recording head.

Note that the non-adsorbed resin rate, the first absorbance, the second absorbance, and the specific phosphorous concentration of each ink shown in Tables 4 and 7 are indicated again below in Tables 8 and 9 for the sake of easy understanding.

TABLE 8

| Ink | Example 1 I-1 | Example 2 I-2 | Example 3 I-3 | Example 4 I-4 | Example 5 I-5 | Example 6 I-6 | Example 7 I-13 | Example 8 I-14 |
| --- | --- | --- | --- | --- | --- | --- | --- | --- |
| Non-adsorbed resin rate [% by mass] | 30 | 30 | 20 | 25 | 50 | 35 | 40 | 30 |
| First absorbance (320 nm) | 0.24 | 0.25 | 0.16 | 0.20 | 0.40 | 0.32 | 0.35 | 0.25 |
| Second absorbance (429 nm) | 0.21 | 0.51 | 0.15 | 0.38 | 0.80 | 0.36 | 0.80 | 0.51 |
| Specific phosphorous concentration [ppm] | 6.0 | 2.0 | 6.0 | 1.0 | 6.0 | 2.0 | 6.0 | 2.0 |
| Skewed ejection | A | A | A | A | A | A | A | A |
| Scratch resistance | A | A | A | A | A | A | A | A |
| Re-solubility | A | A | A | A | A | A | A | A |

TABLE 9

| Ink | Comparative Example 1 I-7 | Comparative Example 2 I-8 | Comparative Example 3 I-9 | Comparative Example 4 I-10 | Comparative Example 5 I-11 | Comparative Example 6 I-12 |
|---|---|---|---|---|---|---|
| Non-adsorbed resin rate [% by mass] | 55 | 15 | 50 | 20 | 50 | 20 |
| First absorbance (320 nm) | 0.50 | 0.12 | 0.40 | 0.16 | 0.40 | 0.16 |
| Second absorbance (429 nm) | 0.80 | 0.15 | 0.80 | 0.26 | 0.90 | 0.13 |
| Specific phosphorous concentration [ppm] | 6.0 | 6.0 | 8.0 | 0.8 | 6.0 | 6.0 |
| Skewed ejection | B | A | B | A | B | A |
| Scratch resistance | A | B | A | A | A | A |
| Re-solubility | A | A | A | B | A | B |

As shown in Table 9, the supernatant obtained from the ink (I-7) had a first absorbance of greater than 0.40. The ink (I-7) did not inhibit occurrence of skewed ink ejection from the recording head.

As shown in Table 9, the supernatant obtained from the ink (I-8) had a first absorbance of less than 0.16. Images formed with the ink (I-8) had poor scratch resistance.

As shown in Table 9, the ink (I-9) had a specific phosphorous concentration of greater than 6.0 ppm. The ink (I-9) did not inhibit occurrence of skewed ink ejection from the recording head.

As shown in Table 9, the ink (I-10) had a specific phosphorous concentration of less than 1.0 ppm. The ink (I-10) had poor re-solubility.

As shown in Table 9, the supernatant obtained from the ink (I-11) had a second absorbance of greater than 0.80. The ink (I-11) did not inhibit occurrence of skewed ink ejection form the recording head.

As shown in Table 9, the supernatant obtained from the ink (I-12) had a second absorbance of less than 0.15. The ink (I-12) had poor re-solubility.

By contrast, the inks (I-1) to (I-6), (I-13), and (I-14) each had a specific phosphorous concentration of at least 1.0 ppm and no greater than 6.0 ppm, had a first absorbance of the supernatant thereof of at least 0.16 and no greater than 0.40, and a second absorbance of the supernatant thereof of at least 0.15 and no greater than 0.80 as shown in Table 8. The inks (I-1) to (I-6), (I-13), and (I-14) inhibited occurrence of skewed ink ejection from the recording head, formed images with excellent scratch resistance, and had excellent re-solubility.

The ink of the present disclosure that encompasses the inks (I-1) to (I-6), (I-13), and (I-14) is determined to able to inhibit occurrence of skewed ink ejection from recording heads, form images with excellent scratch resistance, and have excellent re-solubility. Furthermore, the inkjet recording apparatus of the present disclosure that uses an ink as above is thought to be able to inhibit occurrence of skewed ink ejection from recording heads, form images with excellent scratch resistance, and have excellent re-solubility.

What is claimed is:

1. An inkjet ink comprising:
    a quinacridone pigment;
    a resin; and
    an aqueous medium, wherein
    a 50-fold dilution of a supernatant has a phosphorous concentration of at least 1.0 ppm and no greater than 6.0 ppm, the supernatant being obtained by centrifugation of the inkjet ink at 1,050,000 G for 3 hours,
    on an ultraviolet-visible absorption spectrum of the supernatant, a first peak appears at a first absorbance of at least 0.16 and no greater than 0.40, the first peak being a maximum peak in a wavelength range of the ultraviolet-visible absorption spectrum of at least 300 nm and no greater than 340 nm, and
    on the ultraviolet-visible absorption spectrum of the supernatant, a second peak appears at a second absorbance of at least 0.15 and no greater than 0.80, the second peak being a maximum peak in a wavelength range of the ultraviolet-visible absorption spectrum of at least 400 nm and no greater than 490 nm.

2. The inkjet ink according to claim 1, wherein
    the resin includes an adsorbed resin adsorbed to the quinacridone pigment and a non-adsorbed resin not adsorbed to the quinacridone pigment, and
    a ratio of the non-adsorbed resin in the resin is at least 20% by mass and no greater than 50% by mass.

3. The inkjet ink according to claim 1, wherein
    the resin includes an adsorbed resin adsorbed to the quinacridone pigment and a non-adsorbed resin not adsorbed to the quinacridone pigment, and
    the first peak is a peak derived from the non-adsorbed resin.

4. The inkjet ink according to claim 1, wherein
    the second peak is a peak derived from an intermediate for synthesis of the quinacridone pigment.

5. The inkjet ink according to claim 1, wherein
    the phosphorous concentration is a concentration of a phosphorous atom derived from a phosphorous-containing catalyst for synthesis of the quinacridone pigment.

6. The inkjet ink according to claim 1, wherein
    the phosphorous concentration is a concentration of a phosphorous atom included in at least one selected from the group consisting of polyphosphoric acid and a derivative thereof contained in the supernatant.

7. The inkjet ink according to claim 1, wherein
    the resin includes at least one repeating unit derived from (meth)acrylic acid, at least one repeating unit derived from alkyl (meth)acrylate, and a repeating unit derived from styrene.

8. An inkjet recording apparatus comprising:
    a conveyance section that conveys a recording medium; and
    a recording head that ejects an ink toward the recording medium, wherein
    the ink is the inkjet ink according to claim 1.

9. The inkjet recording apparatus according to claim 8, wherein the recording head is a line head.

10. The inkjet recording apparatus according to claim 8, wherein the recording head has an ejection surface through which nozzles for ejecting the ink are opened, and the inkjet ink recording apparatus further comprises a cleaning member that wipes the ejection surface.

* * * * *